United States Patent [19]
Arata et al.

[11] Patent Number: 4,902,473
[45] Date of Patent: Feb. 20, 1990

[54] ROTARY BRAKE DISC

[75] Inventors: Hiroto Arata; Kenji Shiga, both of Kitakyushu; Daihachiro Sakurai, Tokyo; Kazuo Fujisawa, Kitakyushu; Isao Souma, Hanyu; Yusiyo Watanabe, Hanyu; Akira Tanaka, Iwatsuki, all of Japan

[73] Assignee: Nippon Steel Corporation, Tokyo, Japan

[21] Appl. No.: 122,570

[22] Filed: Nov. 16, 1987

Related U.S. Application Data

[63] Continuation of Ser. No. 725,081, Apr. 19, 1985, abandoned.

[30] Foreign Application Priority Data

Apr. 28, 1984 [JP] Japan .................................. 59-87250

[51] Int. Cl.$^4$ .............................................. C22C 38/22
[52] U.S. Cl. ..................................... 420/105; 420/106; 420/108; 420/110; 420/111; 420/67; 420/68; 420/69; 148/325; 148/326; 148/334; 148/335; 188/251 M; 188/255
[58] Field of Search ............... 148/325, 326, 334, 335; 420/105, 106, 108, 109, 67-69, 110-114; 188/251 M, 255

[56] References Cited

FOREIGN PATENT DOCUMENTS 56-44756  4/1981  Japan .
57-198249 12/1982 Japan .
58-53713 11/1983 Japan .
59-70748  4/1984  Japan .

Primary Examiner—Deborah Yee
Attorney, Agent, or Firm—Kenyon & Kenyon

[57] ABSTRACT

A brake disc material which does not crack under a great braking action, such as in a large-sized truck, consisting of 0.03 percent to 1 percent of carbon, 1.2 percent to 20 percent of chromium, and 0.1 percent to 1 percent of molybdenum, the balance being essentially iron.

6 Claims, 2 Drawing Sheets

ROTARY BRAKE DISC

This application is a continuation, of application Ser. No. 725,081, filed Apr. 19, 1985, abandoned.

BACKGROUND OF THE INVENTION

1. Field of the Invention

The present invention relates to a brake disc material used for a brake assembly of trucks and other large-sized transport vehicles.

2. Description of the Related Art

Brake assemblies for automobiles may be generally classified as drum brake assemblies or disc brake assemblies. Disc brake assemblies are mainly used for small-sized automobiles and drum brake assemblies for large-sized automobiles. However, drum brake assemblies cannot be used effectively for large-sized trucks with a loading capacity of 8 tons or more, since the brake action would not be uniform for every brake or wheel when braking from a high speed. Under extreme conditions, such one-sided action of the brakes would result in accidents.

In a disc brake assembly, a rotary member (below, the "disc") mounted on a wheel is pressed against a pad to create the brake action. The action to the pad is relatively small in a small-sized automobile, therefore there is no particularly serious friction heat and friction wear.

The load applied to the disc is higher, however, in a large-sized automobile, such as a large-sized truck. The friction heat generated by the braking is therefore high. A maze of cracks is thus often generated in discs made of conventional material.

Specifically, since the disc is subjected to great force and hence considerable friction heat when braking a large-sized truck or the like, the temperature of the disc rises quickly. Such a quick temperature rise occurs with every braking action. The disc is therefore exposed to repeated heat impact. This results in the formation of the maze of cracks in a conventional cast-iron disc when used over a long period of time.

The temperature rise results in a local difference in the braking force on the surface of a disc and also promotion of disc wear. If the cracked disc is continued to be used, the cracks propagate further and, eventually, the disc is destroyed.

Because of the above, there is much difficulty in the maintenance of disc brakes in large-sized trucks.

Japanese Examined Patent Publication (Kokoku) No. 58-53713 discloses a disc material containing a small amount of chromium of from 0.6 percent to less than 1.2 percent and a large amount of nickel of from 1.5 percent to 3.0 percent. The disc referred to in this publication is a hat type where only the crack propagation need be prevented and no wear resistance need be considered. The addition of the disclosed alloying chromium and nickel aims to enhance the fracture toughness. The disclosed disc material is, however, inappropriate for use as the rotary disc of a large-sized automobile, such as a large-sized truck, where a considerably high load is applied to the disc.

SUMMARY OF THE INVENTION

It is an object of the present invention to eliminate the drawbacks of the prior art and to provide a disc material which does not crack under a great braking action, such as in a large-sized truck, on the basis of an analysis of the wear mechanism of the disc material and its requisite properties.

In accordance with the objects of the present invention, there is provided a disc material which consists of from 0.03 percent to 1 percent of carbon, from 1.2 percent to 20 percent of chromium, from 0.1 to 1 percent of molybdenum, and, if necessary, 0.1 percent or more of at least one member selected from the group consisting of nickel, titanium, copper, vanadium, niobium, tungsten, and boron, the balance being iron and unavoidable impurities.

BRIEF DESCRIPTION OF THE DRAWINGS

The present invention will be clearer from the ensuing description of the preferred embodiments, made in reference to the accompanying drawings, in which.

DESCRIPTION OF THE PREFERRED EMBODIMENTS

The experiments by the present inventors for arriving at the solution are explained with reference to FIGS. 1, 2, and 3.

Figure 1:
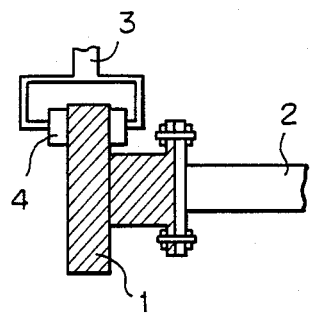
FIG. 1 shows an experimental braking device.

FIG. 1 illustrates the experimental apparatus used by the present inventors. In FIG. 1, a disc 1 was secured to a rotary shaft 2 and caused to rotate at a high speed by means of a driving means (not shown). A hydraulic conduit 3 transmitted pressure to the pads 4, which were thus pressed against the disc 1 in a braking action. The pads 3 were made of conventional semimetallic material composed mainly of steel wool, graphite, and asbestos. In the experiments, braking was carried out for a number of times and intervals simulating actual automobile driving.

Various compositions of cast iron were used for the disc 1. The properties of disc 1 required for effective braking were examined by determining the crack generation circumstances of disc 1, the wear amount of disc 1, the wear amount of the pads 4, and the like.

It was elucidated after the braking test that from 0.1 to 0.4 percent of thermal strain generate on the braking surface on disc 1. It was also elucidated that, during repeated braking, the temperature of the braking surface on disc 1 rises to a temperature of 600° C. or more and, further, cracking is promoted due to the growth phenomenon of cast iron which occurs at that temperature. The growth phenomenon is well known in cast iron. In the case of cast iron discs, it increases the thermal strain above that which would normally be expected due to the temperature rise.

From the elucidations as described above, the inventors concluded that the conventional cast iron being used for disc must be replaced with steel.

This is explained in more detail with reference to FIG. 2, which shows the relationship between the number of repeated braking actions (N) and the strain until the destruction (cracking) of the conventional material, i.e., gray cast iron, and the material of the present invention, described hereinbelow.

Figure 2:
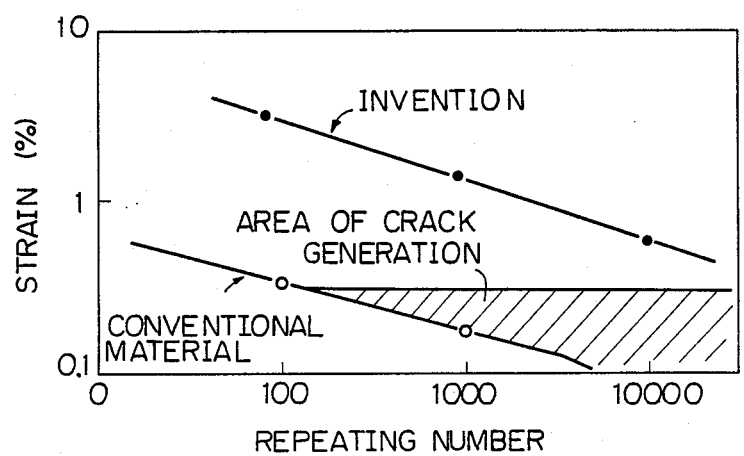
FIG. 2 is a graph of the relationship between the number of braking actions and strain, illustrating the area of crack generation, i.e., where cracks are generated on a disc for the disc of a large-sized truck.

The relationship of Ep.N=constant is given for the occurrence of destruction, where Ep is the strain, as shown in FIG. 2. For example, conventional gray cast iron cracks at 100 repeated braking actions when the strain (Ep) is more than 0.5 percent and does not crack when less than 0.5 percent.

The horizontal straight line of 0.4 percent was determined by the present inventors, using the device shown in FIG. 1, to be the highest value generated in the disc 1. Conventional gray cast iron will therefore crack at approximately 150 to 200 repeated braking actions. Contrary to this, the material of the present invention does not crack until more than 10,000 repeated braking actions. This indicates a longer life of the material of the present invention than that of conventional gray cat iron. When the destruction of the two materials is compared at 1000 repeated braking actions, the requisite strain for destruction of the former is 0.2 percent and the strain of the latter is 1.15 percent. This indicates that the material of the present invention is highly resistant against destruction when it is subjected to high strain.

Figure 3:
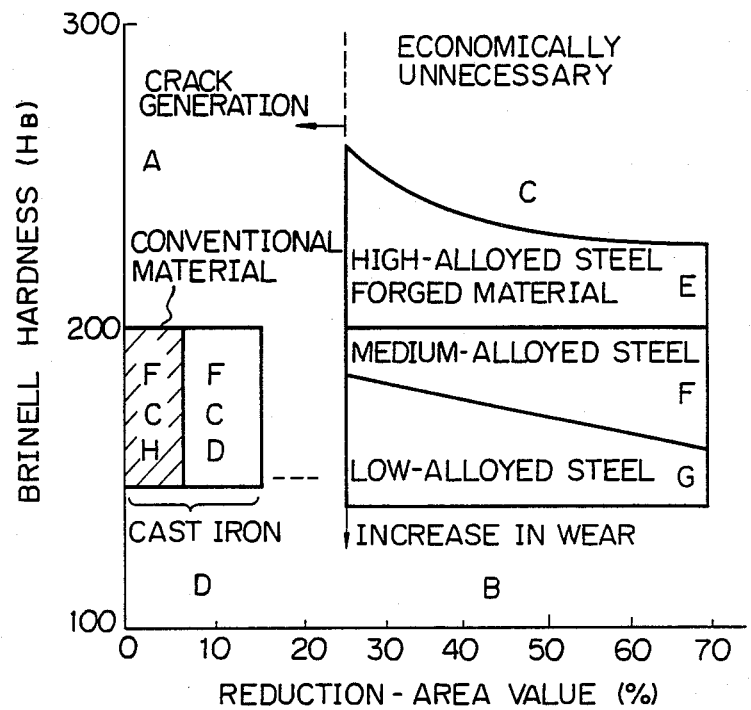
FIG. 3 is a graph of the Brinell hardness and the reduction area value of ferrous materials.

Referring to FIG. 3, the investigations by the present inventors for the friction property of ferrous materials required for braking are explained.

When the value of the reduction of area of the ferrous materials is 25 percent or less (area A), cracks generate. When the hardness is $H_B$ 150 or less (area B), the wear amount becomes high. Ferrous materials exhibiting the properties falling within both the areas A and B are thus inappropriate for use as the disc material for a large-sized automobiles.

FCH in FIG. 3 corresponds to gray cast iron stipulated in the Japan Industrial Standard (JIS) G 5501 and exhibits a reduction of area of 8 percent or less. FCD corresponds to gray cast iron stipulated in JIS G 5502 and is improved over FCD in the reduction of area, exhibiting a reduction of area of 15 percent or less. FCH and FCD are collectively designated as cast iron "D", which has heretofore been used as disc materials. Such materials fall within the area A. No improvement of these materials in the reduction area appears to shift them outside the area A.

In the area C, both high hardness and high reduction of area are attained. In order to provide ferrous materials with the properties of area C, incorporation of a large amount of special elements or other measures are essential. These measures, however, are difficult to employ on an industrial scale. In addition, the hardness of area C is not necessary for the light of wear resistance of a disc.

Accordingly, the areas except for A, B, C, and D, i.e., the areas E, F, and C, provide the required wear and cracking resistance.

The properties of area E are attained by high alloyed forged steels, such as 13 chromium steels. These steels are, however, expensive, except for special cases. There is therefore no real advantage to using high alloyed forged steels having the property of area E.

The properties of area F are attained by medium-alloyed steels with an alloying element content of 3 percent or more. These steels can be used only in a case where they are subjected to severe wear.

The properties of area G are attained by low-alloyed steels containing alloying elements in an amount of 3 percent or less. Since such steels can attain the requested hardness and reduction area at a low content of alloying elements, they are most desirable for use as disc materials for large-sized trucks.

The disc material disclosed in Japanese Examined Patent Publication No. 58-53713 falls within the areas F or G. This material may have an acceptable wear resistance, but its properties are not appropriate, because of its low chromium content, for use as a disc in view of its poor characteristics at high temperature.

The "Study of High-Speed Railway" (published by the "Ken Yu Sha" Foundation on Mar. 31, 1967) describes the experimental use of a 0.2 percent carbon and 0.9 percent chromium steel, which falls within the area G, for the train brakes. It is reported in this study that scratch flaws and tearing of flaws generate on the steel mentioned above.

The 0.2 percent carbon and 0.9 percent chromium steel would also suffer from the flaws mentioned above if used as the disc material of a large-sized automobile. In addition, due to the low chromium content of this steel, the wear resistance and oxidation resistance are too poor for use as the disc material of a large-sized automobile.

Accordingly, the composition of ferrous materials falling within the area G must be further investigated.

Again referring to the steel disclosed in Japanese Examined Patent Publication No. 58-53713, the highest chromium content of less than 1.2 percent (Cr<1.2%) is too low to provide high resistance against cracking under thermal fatigue, oxidation wear, and deformation under a high temperature. Nickel, which is an indispensable element, does not exert a direct influence upon the braking characteristics of a disc but exerts an influence on the hardness, as is explained more in detail hereinbelow. Rather, nickel has a detrimental influence when the steel mentioned above is used as the disc material of a large-sized automobile. That is, the steel is hardened during the braking action followed by cooling and thus is liable to crack. Not only cracking, but also considerable oxidation wear occurs, so that the steel mentioned above is not appropriate for long-term use as with disc brakes.

The above experiments and considerations can be summarized as follows: For the disc material of a small-sized automobile, the principally required properties are wear resistance and low cost. Cast iron meets these properties. For the disc material of a large-sized automobile, the principally required properties are resistance against cracking, thermal fatigue, thermal impact, and oxidation wear. These properties are not requested for the disc material of a small-sized automobile. The present invention was completed after extensive study of the properties of ferrous materials, which have heretofore not been used as disc materials.

The composition of the material according to the present invention is now explained.

Carbon must be present in at least 0.03 percent for forming carbides with iron, chromium, molybdenum, or the like and enhancing the wear resistance. The carbon content is maintained at 1.0 percent at the highest so as not to lessen the value of reduction of area. When the carbon content is of a low value within the range of from 0.03 to 1.0 percent, a large amount of an alloying element is required to obtain a high hardness. In this case, the cost of ferrous material is enhanced. When the carbon content is of an extremely low in value the range of from 0.03 to 1.0 percent, pure raw materials must be selected so as to prevent carbon incorporation into the melt from alloying additives. Also in this case, the cost of ferrous material is increased. When the carbon content is 0.5 percent or more, forging is necessary to obtain a requested reduction of area. The preferable carbon content is therefore from 0.1 to 0.5 percent. In this case, cast material can be advantageously used.

Chromium enhances the wear resistance, the oxidation wear resistance, and the γ-transformation point. At least 1.2 percent of chromium is necessary for obtaining these enhancement effects. The material cost increases and the material embrittles at a chromium content of more than 20 percent. The preferable chromium content is therefore from more than 1.2 percent to 3 percent.

Molybdenum effectively enhances the ductility and wear resistance at a content of 0.1 percent or more. The highest molybdenum content is 1 percent from an economical point of view.

According to a preferred embodiment of the present invention, the ferrous material exhibits 25 percent or more of reduction of area and hardness $H_B$ of 150 or more at normal temperature and a temper softening resistance in terms of hardness at 500° C., more than 50 percent of the hardness at the normal temperature.

The temper softening resistance according to this embodiment was determined after investigation of wear occurring during the braking action using the device as shown in FIG. 1. The temperature of the braking surface of disc 1 rises to 600° C. or more during the braking action and even to the γ-phase region in the case of an extreme temperature rise. Under such a temperature rise, the disc material softens, is oxidized, and is then worn out. In order to provide the disc 1 with a high wear resistance, the material of disc 1 should be resistant against temper softening and oxidation. The temper softening resistance according to the embodiment mentioned above makes it possible for the material not to wear out. The properties of the embodiment are basically attained by the composition mentioned above. In this regard, the carbon content of 1.0 percent or less provides the reduction of area, and chromium and molybdenum provide the temper softening resistance. In addition, the desired reduction of area is attained in the cast material at 0.8 percent carbon or less, preferably 0.5 percent or less.

The ferrous material according to the present invention may further contain silicon and manganese as well as impurities. Silicon deoxidizes oxygen as in usual steel-making and prevents gas defects from occurring due to oxygen contamination from a mold as in usual casting. In addition, silicon suppresses the oxidation during the braking action. The preferable silicon content is from 0.4 percent to 2.5 percent. If the silicon content exceeds 2.5 percent, the ferrous material embrittles. Manganese is a deoxidizing element like silicon. The manganese content may be a usual one.

In addition to the above described elements, the ferrous material according to the present invention may contain 0.1 percent or more of at least one element selected from the group consisting of nickel, titanium, copper, vanadium, tungsten, and boron. When two or more elements are added, the total lowest content should be 0.1 percent. These elements can enhance the strength, the toughness, the wear resistance, and the thermal impact resistance. The highest content (total content in the case of two or more elements) is preferably 2 percent.

The process for producing the disc for a disc brake is now described.

The rotary member for a disc brake (below, the "disc") can be produced by casting, forging, or welding assembling or a combination of the same. The disc is preferably equipped with fins for reinforcing cooling. In order to produce the disc with fins and to reduce the cost, casting in preferred.

The ferrous composition is melted in a basic electric arc furnace or basic high frequency furnace and is then cast into molds. The types of molds are not specifically limited, but are, preferably, green sand molds, $CO_2$ molds, Hardox molds (tradename of S.A.P.I.C. of France), and shell molds. The core of the molds must be bonded by an organic binder. The cast material is normalized, preferably at a temperature of from 850° to 970° C. and then tempered preferably at a temperature of from 700° to 730° C., when the chromium content is 10 percent or less. Normalizing and tempering are unnecessary for material containing more than 10 percent of chromium. Nickel in an amount of from 0.5 to 1.0 percent enhances the hardenability, so that discs having low cooling speed due to mass effect can be satisfactorily normalized.

The present invention is now explained by way of examples, which by no means limit the scope of the invention.

EXAMPLES

Figure 4:
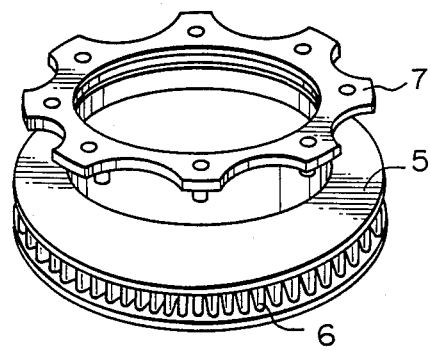
FIG. 4 is an elevational view of a disc for use in a large-sized truck.

In FIG. 4, the shape of the discs for the disc brake produced in the examples is shown. Reference numeral 5 indicates the braking surface, 6 the fins for reinforcing the cooling, and 7 a plate for mounting a tire.

The chemical composition and mechanical properties of the discs as well as the results of a braking test are shown in Table 1.

The disc materials given in Table 1 are cast materials. "Conventional Material" indicates gray cast iron, while "Invention A-I" indicates cast steel which is normalized at 950° C. and tempered at 710° C.

As is apparent from Table 1, the disc materials according to the present invention do not crack under conditions where the conventional cast iron cracks. The cracks are of a maze form and are serious. The wear of the disc materials according to the present invention is also smaller than that of the conventional cast iron.

The tensile strength and reduction of area obtained according to the present invention are considerably greater than those of the conventional cast iron. The materials D through E have hardnesses at normal temperature almost equal to that of the conventional gray cast iron and exhibit higher tensile strength and reduction of area. The materials B, C, and H have higher hardnesses at normal temperature than that of the conventional gray cast iron. These mechanical properties of materials A-H superior to those of the conventional gray cast iron are also maintained at 500° C.

TABLE 1

| | C % | Si % | Mn % | P % | S % | Ni % | Cr % | Mo % | V % | Cu % | W % | Nb % | B % | Normal Temperature Tensile Strength kg/mm² | Normal Temperature Reduction of area % | Normal Temperature Hardness H_B | 500° C. Tensile Strength kg/mm² | 500° C. Reduction of area % | 500° C. Hardness H_B | Breaking Test Cracks | Breaking Test Wear Amount (mm) |
|---|---|---|---|---|---|---|---|---|---|---|---|---|---|---|---|---|---|---|---|---|---|
| Conventional Material | 3.5 | 1.80 | 0.40 | 0.038 | 0.025 | — | — | — | — | — | — | — | — | 25 | 0.5 | 200 | 18 | 2 | 120 | Yes | 3.7 |
| Invention A | 0.21 | 0.61 | 0.85 | 0.024 | 0.015 | 0.46 | 1.50 | 0.46 | — | — | — | — | — | 80 | 60 | 260 | 60 | 65 | 220 | No | 2.0 |
| Invention B | 0.30 | 0.40 | 0.67 | 0.021 | 0.016 | — | 1.5 | 1.0 | 1.0 | — | — | — | — | 87.0 | 40.0 | 280 | 65 | 60 | 230 | " | 1.8 |
| Invention C | 0.10 | 0.41 | 1.20 | 0.022 | 0.015 | 1.2 | 15.0 | 0.8 | — | — | — | — | — | 65 | 50 | 400 | 45 | 70 | 320 | " | 0.5 |
| Invention D | 0.15 | 0.35 | 0.55 | 0.021 | 0.016 | — | 2.25 | 1.0 | — | — | — | — | — | 84 | 50 | 220 | 57 | 73 | 200 | " | 1.5 |
| Invention E | 0.12 | 0.42 | 0.80 | 0.019 | 0.017 | — | 9.0 | 1.0 | — | — | — | — | — | 56 | 72 | 190 | 41.0 | 72 | 170 | " | 0.7 |
| Invention F | 0.2 | 0.43 | 0.85 | 0.023 | 0.014 | — | 5.0 | 1.0 | — | — | — | — | — | 57 | 65 | 185 | 40.0 | 70 | 160 | " | 1.0 |
| Invention G | 0.25 | 1.05 | 0.81 | 0.021 | 0.016 | — | 1.50 | 0.70 | — | 1.0 | 0.5 | — | — | 82.0 | 45.0 | 230 | 62 | 63 | 210 | " | 1.80 |
| Invention H | 0.28 | 1.20 | 0.60 | 0.018 | 0.016 | — | 1.60 | 0.5 | — | — | — | 0.70 | — | 84.0 | 45.0 | 265 | 61.0 | 58 | 220 | " | 1.7 |
| Invention I | 0.19 | 0.60 | 0.43 | 0.020 | 0.013 | — | 1.53 | 0.55 | — | — | — | — | 0.003 | 85.5 | 45.0 | 280 | 62.5 | 60.0 | 225 | " | 1.9 |

We claim:

1. A steel brake disc for a truck consisting essentially of 0.1–0.5 percent of carbon, from 1.2 to 10 percent of chromium, from 0.1 to 1 percent of molybdenum, and the balance of essentially iron and unavoidable impurities, said disc being disposed in a rotary disc brake assembly.

2. A brake disc material according to claim 1, which exhibits 25 percent or more of reduction of area and 150 or more hardness $H_B$ at normal temperature and a temper softening resistance in terms of hardness at 500° C. more than 50 percent of the hardness at normal temperature.

3. A brake disc material according to claim 1 or 2, further containing 0.1 percent to 2 percent of at least one element selected from the group consisting of nickel, titanium, copper, vanadium, niobium, tungsten, and boron, with the maximum nickel present being 1.2 percent.

4. A brake disc material according to claim 1 or 2, further containing from 0.4 to 2.5 percent of silicon.

5. A brake disc material according to claim 3, further containing from 0.4 to 2.5 percent of silicon.

6. A rotary brake disc fabricated from a material according to claim 1, wherein the brake disc material is normalized and tempered.

* * * * *